(12) United States Patent
Huang et al.

(10) Patent No.: US 11,791,722 B2
(45) Date of Patent: Oct. 17, 2023

(54) SWITCHED CAPACITOR CONVERTER CIRCUIT AND SWITCHING CONVERTER UNIT THEREOF

(71) Applicant: Richtek Technology Corporation, Zhubei (TW)

(72) Inventors: Tsung-Wei Huang, Taipei (TW); Ding-Yu Wei, Taipei (TW); Sheng-Kai Fan, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 239 days.

(21) Appl. No.: 17/511,645

(22) Filed: Oct. 27, 2021

(65) Prior Publication Data

US 2022/0166312 A1    May 26, 2022

Related U.S. Application Data

(60) Provisional application No. 63/118,619, filed on Nov. 25, 2020.

(30) Foreign Application Priority Data

Jul. 29, 2021   (TW) .................. 110127981

(51) Int. Cl.
*H02M 3/07*   (2006.01)
*H02M 3/158*  (2006.01)

(52) U.S. Cl.
CPC .............. *H02M 3/07* (2013.01); *H02M 3/158* (2013.01)

(58) Field of Classification Search
CPC ............ H02M 3/07; H02M 7/06; H02M 7/10; H02M 7/19; H02M 7/25; H02M 3/156; H02M 3/158; H02M 3/1588; H02M 3/155; H02M 3/1582; H02M 3/157; H02M 3/1563; H02M 3/1584
See application file for complete search history.

(56) References Cited

U.S. PATENT DOCUMENTS 6,563,235 B1 *  5/2003  McIntyre ................ H02M 3/07
                                                  307/110

* cited by examiner

*Primary Examiner* — Bryan R Perez
(74) *Attorney, Agent, or Firm* — Tung & Associates

(57) ABSTRACT

A switched capacitor converter circuit includes: plural capacitors and plural switches which switch the connections of the plural capacitors periodically. In a first period, the plural switches control a first capacitor to be electrically connected between a first power and a second power, and control a second capacitor and a third capacitor to be electrically connected in series between the second power and a ground level. In a second period, the plural switches control the first capacitor and the second capacitor to be electrically connected in series between the second power and the ground, and control the third capacitor and the second capacitor to be electrically connected in parallel with the second power, thereby a second current of the second power is 4 times of a first current of the first power.

17 Claims, 14 Drawing Sheets

SWITCHED CAPACITOR CONVERTER CIRCUIT AND SWITCHING CONVERTER UNIT THEREOF

CROSS REFERENCE

The present invention claims priority to U.S. 63/118,619 filed on Nov. 25, 2020 and claims priority to TW 110127981 filed on Jul. 29, 2021.

BACKGROUND OF THE INVENTION

Field of Invention

The present invention relates to a switched capacitor converter circuit; particularly, it relates to such switched capacitor converter circuit having different selectable conversion ratios. The present invention also relates to a switching converter unit for use in a switched capacitor converter circuit.

Description of Related Art

FIG. 1 shows a conventional charging system 1000 and an N-fold switched capacitor converter 100 therein. The N-fold switched capacitor converter 100 executes power conversion between the first power (corresponding to a first voltage V1 and a first current I1) and the second power (corresponding to a second voltage V2 and a second current I2) by switching at least one capacitor (e.g., capacitor CFLY). In the N-fold switched capacitor converter 100, N is a predetermined number, which is a ratio between the first voltage V1 and the second voltage V2, and is also a ratio between the second current I2 and the first current I1. For example, N can be predetermined as two or four.

As shown in FIG. 1, in a typical application, the N-fold switched capacitor converter 100 can function as for example a charging circuit, to convert a first power supplied from for example an adapter 30 complying with USB Type C Specification to a second power, so as to charge a battery by the second power.

Please refer to FIG. 2 in conjugation with FIG. 1. FIG. 2 illustrates a characteristic curve depicting the efficiency of the conventional charging system and the N-fold switched capacitor converter therein of FIG. 1. There are many parasitic resistances (for example, parasitic resistances Rcn and Rwr in the connectors and the wire, and a conduction resistance of a load switch) existing on the path of the first current I1 supplied from the adapter 30, and as the first current I1 increases, the power loss due to the parasitic resistances becomes greater. In this regard, if the ratio N of the second current I2 to the first current I1 is increased, the second current I2 (corresponding to a charging current) having a same level can be converted from a first current I1 having a relatively lower level. This is one way to reduce the power loss due to the parasitic resistances, but it has its downside.

Please refer to FIG. 3, which shows a schematic circuit diagram of a conventional switched capacitor converter 300. The conventional switched capacitor converter 300 includes: an upstream switching converter unit 131 and a downstream switching converter unit 132 which are coupled to each other. Each of the switching converter unit 131 and the switching converter unit 132 has a current conversion ratio of for example 2-fold. Under such situation, an output current I12 of the switching converter unit 131 is 2 times of a first current I1, whereas, an output current (corresponding to a second current I2) of the switching converter unit 132 is 2 times of the output current I12 of the switching converter unit 131.

The prior art switched capacitor converter 300 shown in FIG. 3 has the following drawback that: because the voltage conversion ratio is higher, it is required for the switches Q21~Q28 in the switching converter unit 131 to be capable of withstanding high voltage. From another perspective, it is required for half of the total switches Q21~Q28 and Q31~Q38 in the switching converter units 131 and 132 to be capable of withstanding high voltage; under such situation, the manufacturing cost is high.

In view of the above, to overcome the drawbacks in the prior arts, the present invention proposes an innovative switched capacitor converter circuit capable of support multiple different current conversion ratios and voltage conversion ratios; in addition, the switched capacitor converter circuit according to the present invention requires a relatively less number of switches which need to withstand high voltage, so the manufacturing cost as well as the circuit size can be effectively reduced.

SUMMARY OF THE INVENTION

From one perspective, the present invention provides a switched capacitor converter circuit, which is configured to operably convert a first power to a second power or convert the second power to the first power; the switched capacitor converter circuit comprising: at least one switching converter unit; and a control circuit, which is configured to operably control the at least one switching converter unit; wherein the at least one switching converter unit includes: a plurality of capacitors including a first capacitor, a second capacitor and a third capacitor; and a plurality of switches, which are configured to operably and periodically switch the connections of the plurality of capacitors according to a switching period; wherein in a 4-fold conversion mode, during a first period within the switching period, the plurality of switches control the first capacitor to be electrically connected between the first power and the second power and control the second capacitor and the third capacitor to be electrically connected in series between the second power and a ground level; wherein in the 4-fold conversion mode, during a second period within the switching period, the plurality of switches control the first capacitor and the second capacitor to be electrically connected in series between the second power and the ground level and control the third capacitor to be electrically connected in parallel with the second power; whereby power conversion between the first power and the second power is executed through periodically repeating the switching period, so that in the 4-fold conversion mode, a first voltage of the first power is 4 times of a second voltage of the second power, whereas, a second current of the second power is 4 times of a first current of the first power.

From another perspective, the present invention provides a switching converter unit, which is configured to operably convert a first power to a second power or convert the second power to the first power; the switching converter unit comprising: a plurality of capacitors including a first capacitor, a second capacitor and a third capacitor; and a plurality of switches, which are configured to operably and periodically switch the connections of the plurality of capacitors according to a switching period; wherein in a 4-fold conversion mode, during a first period within the switching period, the plurality of switches control the first capacitor to be electrically connected between the first power and the second power and control the second capacitor and the third capacitor to be electrically connected in series between the second power and a ground level; wherein in the 4-fold conversion mode, during a second period within the switching period, the plurality of switches control the first capacitor and the second capacitor to be electrically connected in series between the second power and the ground level and control the third capacitor to be electrically connected in parallel with the second power; whereby power conversion between the first power and the second power is executed through periodically repeating the switching period, so that in the 4-fold conversion mode, a first voltage of the first power is 4 times of a second voltage of the second power, whereas, a second current of the second power is 4 times of a first current of the first power.

In one embodiment, in the 4-fold conversion mode, during a steady state, a ratio among a voltage across the first capacitor, a voltage across the second capacitor, and a voltage across the third capacitor is 3:2:1.

In one embodiment, the plurality of switches include: first to eighth switches, wherein the first switch, the second switch, the third switch and the fourth switch are sequentially coupled in in series between the first power and the second power, and wherein the first switch and the second switch are coupled to a first node in between, whereas, the second switch and the third switch are coupled to a second node in between, whereas, the third switch and the fourth switch are coupled to a third node in between, and wherein the fifth switch and the sixth switch are coupled in series between the second power and the ground level and are coupled to a fourth node in between, wherein the seventh switch and the eighth switch are coupled in series between the second power and the ground level and are coupled to a fifth node in between; wherein the first capacitor is coupled between the first node and the fourth node, whereas, the second capacitor is coupled between the second node and the fifth node, whereas, the third capacitor is coupled between the third node and the fourth node; wherein in the 4-fold conversion mode, during the first period, the first switch, the third switch, the fifth switch and the eighth switch are ON, whereas, the second switch, the fourth switch, the sixth switch and the seventh switch are OFF, thus controlling the first capacitor to be electrically connected between the first power and the second power and thus controlling the second capacitor and the third capacitor to be electrically connected in series between the second power and the ground level; wherein in the 4-fold conversion mode, during the second period, each of the first switch to the eighth switch is operated according to a state complementary to a state during the first period, so as to control the first capacitor and the second capacitor to be electrically connected in series between the second power and the ground level and control the third capacitor to be electrically connected in parallel with the second power; whereby the power conversion between the first power and the second power is executed through periodically repeating the switching period.

In one embodiment, in a 2-fold conversion mode, the second switch and the third switch are always ON; wherein in the 2-fold conversion mode, during a first period within the switching period, the first switch, the fifth switch and the seventh switch are ON, whereas, the fourth switch, the sixth switch and the eighth switch are OFF, thus controlling the first capacitor, the second capacitor and the third capacitor to be electrically connected in parallel between the first power and the second power; wherein in the 2-fold conversion mode, during a second period within the switching period, the first switch and each of the fourth switch to the eighth switch are operated according to a state complementary to a state during the first period, so as to control the first capacitor, the second capacitor and the third capacitor to be electrically connected in parallel between the second power and the ground level; whereby the power conversion between the first power and the second power is executed through periodically repeating the switching period, so that in the 2-fold conversion mode, a first voltage of the first power is 2 times of a second voltage of the second power, whereas, a second current of the second power is 2 times of a first current of the first power.

In one embodiment, in a 3-fold conversion mode, during a first period within the switching period, the first switch, the second switch, the fourth switch, the sixth switch and the seventh switch are ON, whereas, the third switch, the fifth switch and the eighth switch are OFF, thus controlling the first capacitor to be electrically connected between the first power and the ground level and thus controlling the second capacitor and the third capacitor to be electrically connected in series between the first power and the second power; wherein in the 3-fold conversion mode, during the second period, each of the first switch to the eighth switch is operated according to a state complementary to a state during the first period, so as to control a first end of the first capacitor to be floating, and so as to control a second end of the first capacitor to be electrically connected with the second power, and so as to control the second capacitor and the third capacitor to be electrically connected in series between the second power and the ground level; whereby the power conversion between the first power and the second power is executed through periodically repeating the switching period, so that in the 3-fold conversion mode, a first voltage of the first power is 3 times of a second voltage of the second power, whereas, a second current of the second power is 3 times of a first current of the first power.

In one embodiment, the first switch includes: a first transistor and a second transistor connected in series to each other, wherein a direction of a body diode of the first transistor is opposite to a direction of a body diode of the second transistor.

In one embodiment, in a bypass mode, the first switch to the fourth switch are ON, whereas, the fifth switch to the eighth switch are OFF, so that the first power is directly electrically connected to the second power.

In one embodiment, the at least one switching converter unit includes: a first switching converter unit and a second switching converter unit, which are coupled in parallel between the first power and the second power, wherein each of the first switching converter unit and the second switching converter unit switches respective corresponding plurality of switches by interleaving phases, so as to execute power conversion between the first power and the second power.

In one embodiment, a first part of the plurality of switches have a first withstand voltage, and wherein a peak voltage that the first part of the plurality of switches are required to withstand during power conversion is defined as a first peak voltage, wherein a second part of the plurality of switches have a second withstand voltage, and wherein a peak voltage that the second part of the plurality of switches are required to withstand during power conversion is defined as a second peak voltage, wherein the first peak voltage is 2 times of the second peak voltage.

In one embodiment, a number of the first part of the plurality of switches is smaller than ½ of a total number of the plurality of switches, whereas, a number of the second part of the plurality of switches is greater than ½ of the total number of the plurality of switches.

In one embodiment, in the 4-fold conversion mode, the first part of the plurality of switches include: the second switch and the third switch, whereas, the second part of the plurality of switches include: the first switch and the fourth switch to the eighth switch.

In one embodiment, a relationship among the first peak voltage, the second peak voltage, the first withstand voltage and the second withstand voltage can be represented as follow: the first withstand voltage is greater than the first peak voltage; and the first peak voltage is greater than the second withstand voltage; and the second withstand voltage is greater than the second peak voltage.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
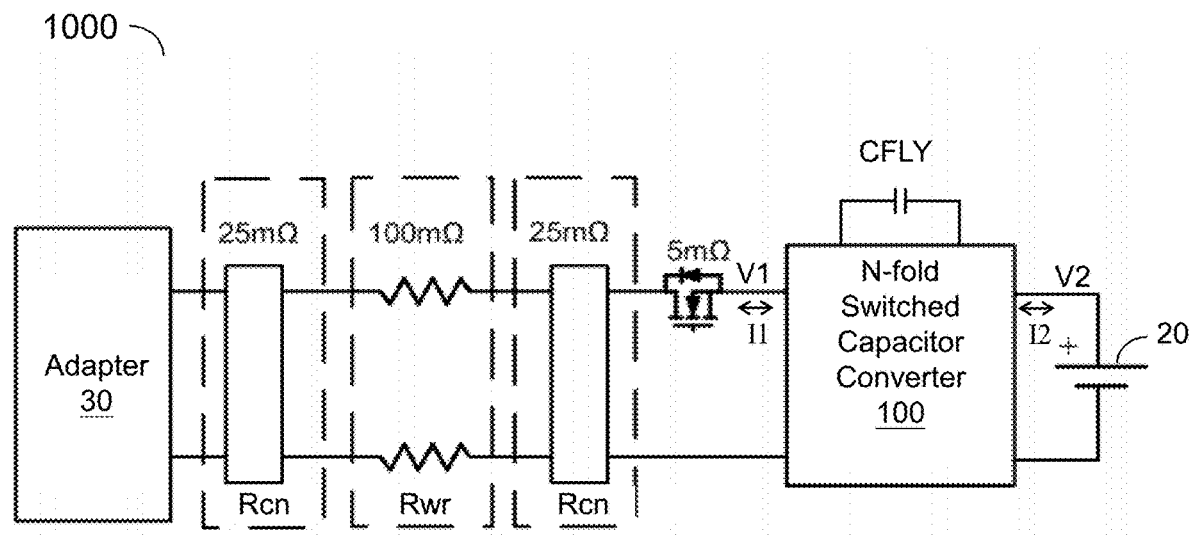
FIG. 1 shows a schematic circuit block diagram of a conventional charging system and an N-fold switched capacitor converter therein.
Figure 2:
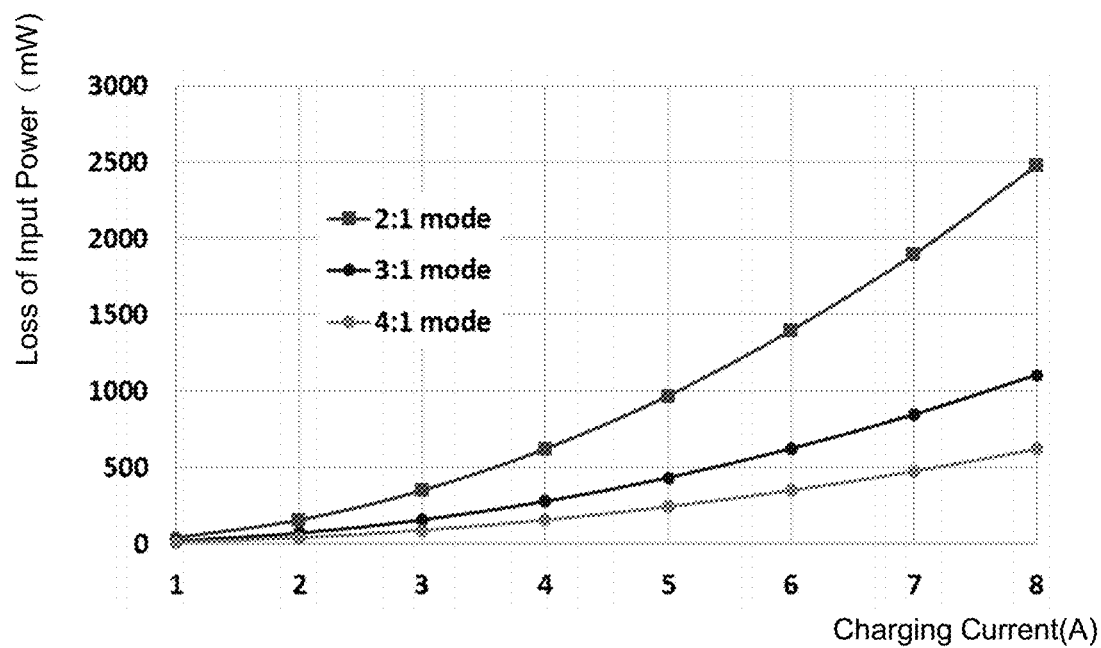
FIG. 2 illustrates a characteristic curve diagram depicting the efficiency of the conventional charging system and the N-fold switched capacitor converter therein of FIG. 1.
Figure 3:
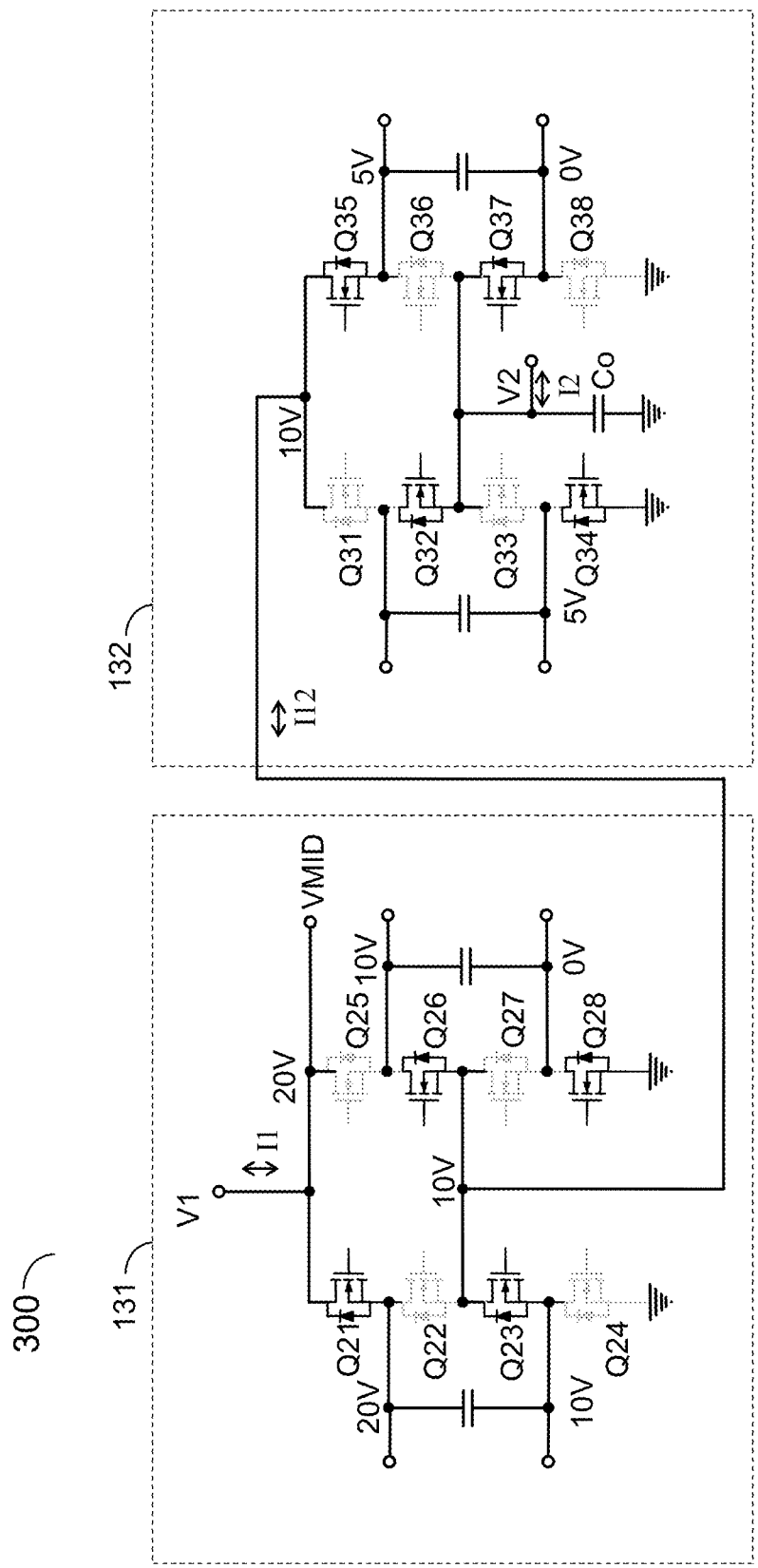
FIG. 3 shows a schematic circuit diagram of a conventional N-fold switched capacitor converter.
Figure 4:
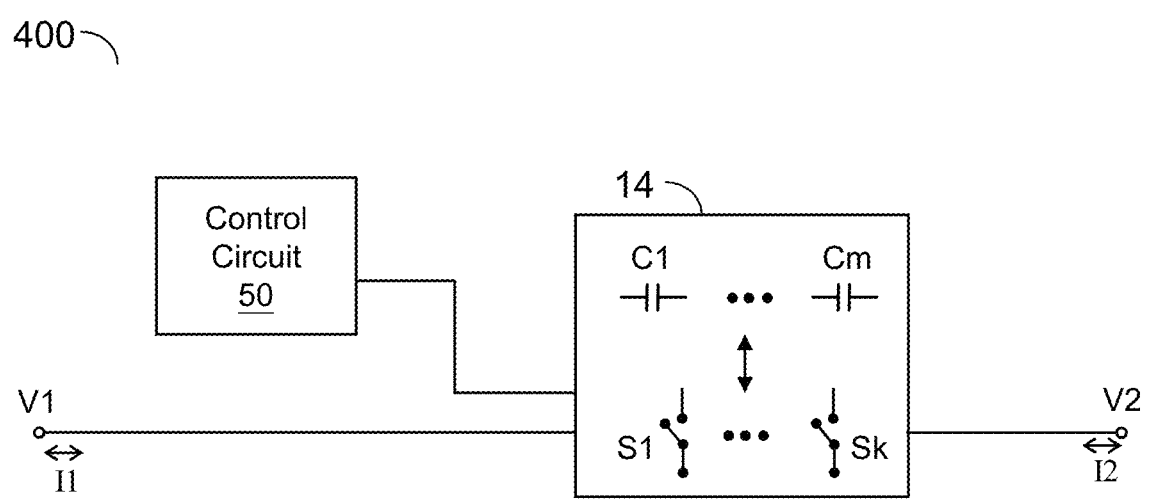
FIG. 4 shows a schematic circuit block diagram of a switched capacitor converter circuit according to an embodiment of the present invention.

Please refer to FIG. 4, which shows a schematic circuit block diagram of a switched capacitor converter circuit according to an embodiment of the present invention. In one embodiment, the switched capacitor converter circuit 400 is configured to operably convert a first power (corresponding to a first voltage V1 and a first current I1) to a second power (corresponding to a second voltage V2 and a second current I2) or convert the second power to the first power. The switched capacitor converter circuit 400 comprises: at least one switching converter unit (as shown by switching converter unit 14 in FIG. 4) and a control circuit 50. The switching converter unit 14 includes: capacitors (e.g., capacitors C1~Cm, wherein m denotes an integer greater than or equal to two) and switches (e.g., switches S1~Sk, wherein k denotes an integer greater than or equal to two). The switches S1~Sk are configured to operably and periodically switch the connections of the capacitors C1~Cm according to a switching period Ts, for achieving conversion between the first power and the second power. The control circuit 50 is configured to operably control the switching converter unit 14.

In one embodiment, the first power is supplied from for example an adapter complying with USB Type C Specification, whereas, the second power is configured to operably charge a battery. In one embodiment, the first current I1 and the second current I2 are both a constant current. The second current I2 is N times of the first current I1, wherein N denotes a natural number greater than or equal to one. In an implementation wherein the constant first current I1 is supplied from an adapter, so as to generate the constant second current I2 for charging a battery, a level of the first voltage V1 is determined by the second voltage V2 (corresponding to a battery voltage). To elaborate in more detail, the first voltage V1 is N times of the second voltage V2. During a charging process, because the battery voltage is varied along the progress of the charging process, the first voltage V1 and the second voltage V2 are both varied along the progress of the charging process.

In another embodiment, the first voltage V1 and the second voltage V2 are both a constant voltage. The first voltage V1 is N times of the second voltage V2.

In another embodiment, the second voltage V2 for example corresponds to a battery voltage supplied from a battery. Under such situation, the switching converter unit 14 can convert the battery voltage to a first power, so as to supply the first power to an external load. The above-mentioned operation corresponds to for example an operation of USB OTG (On The Go).

Figure 5A:
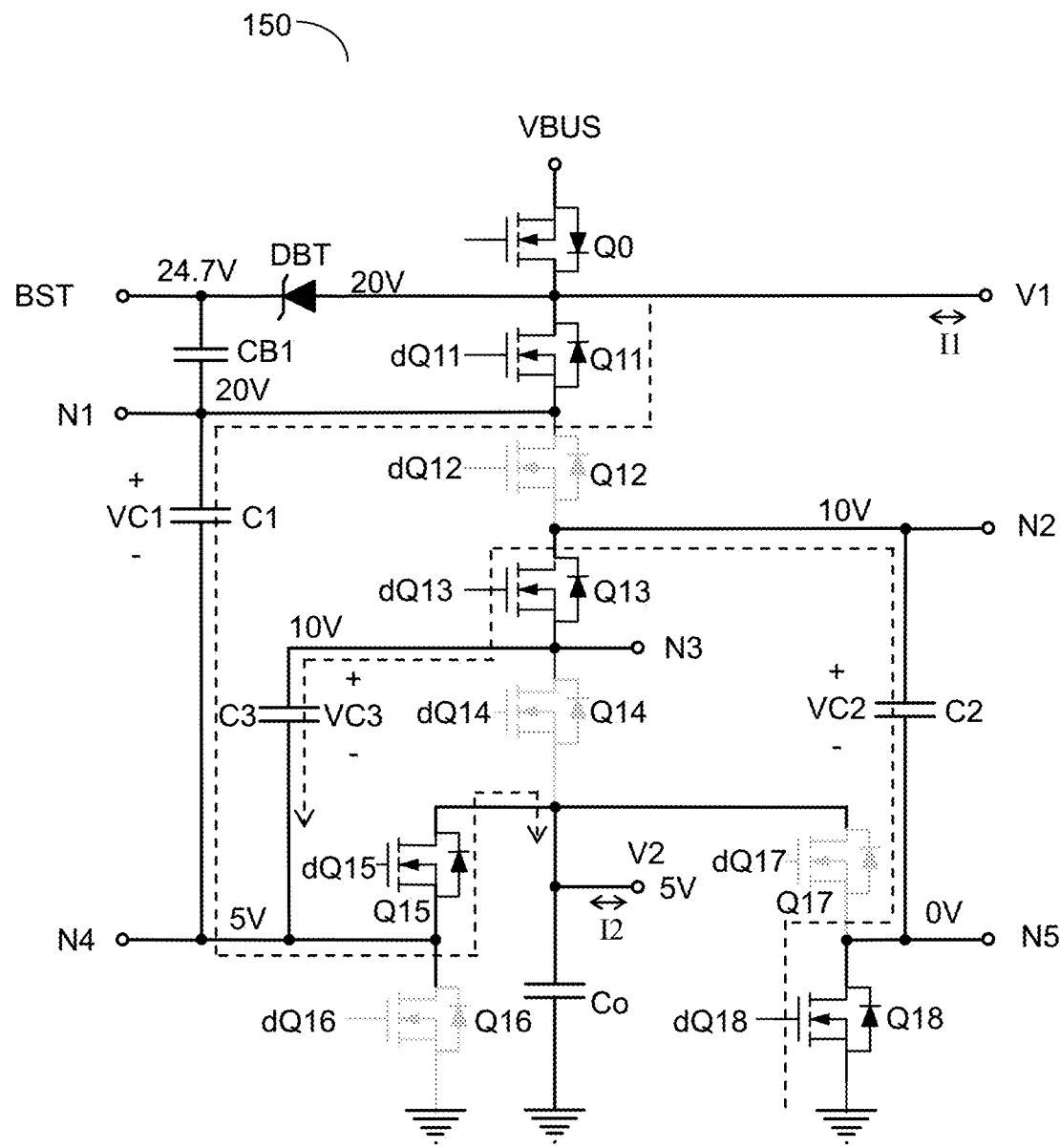
FIG. 5A and FIG. 5B show a specific embodiment of a switching converter unit.
Figure 5B:
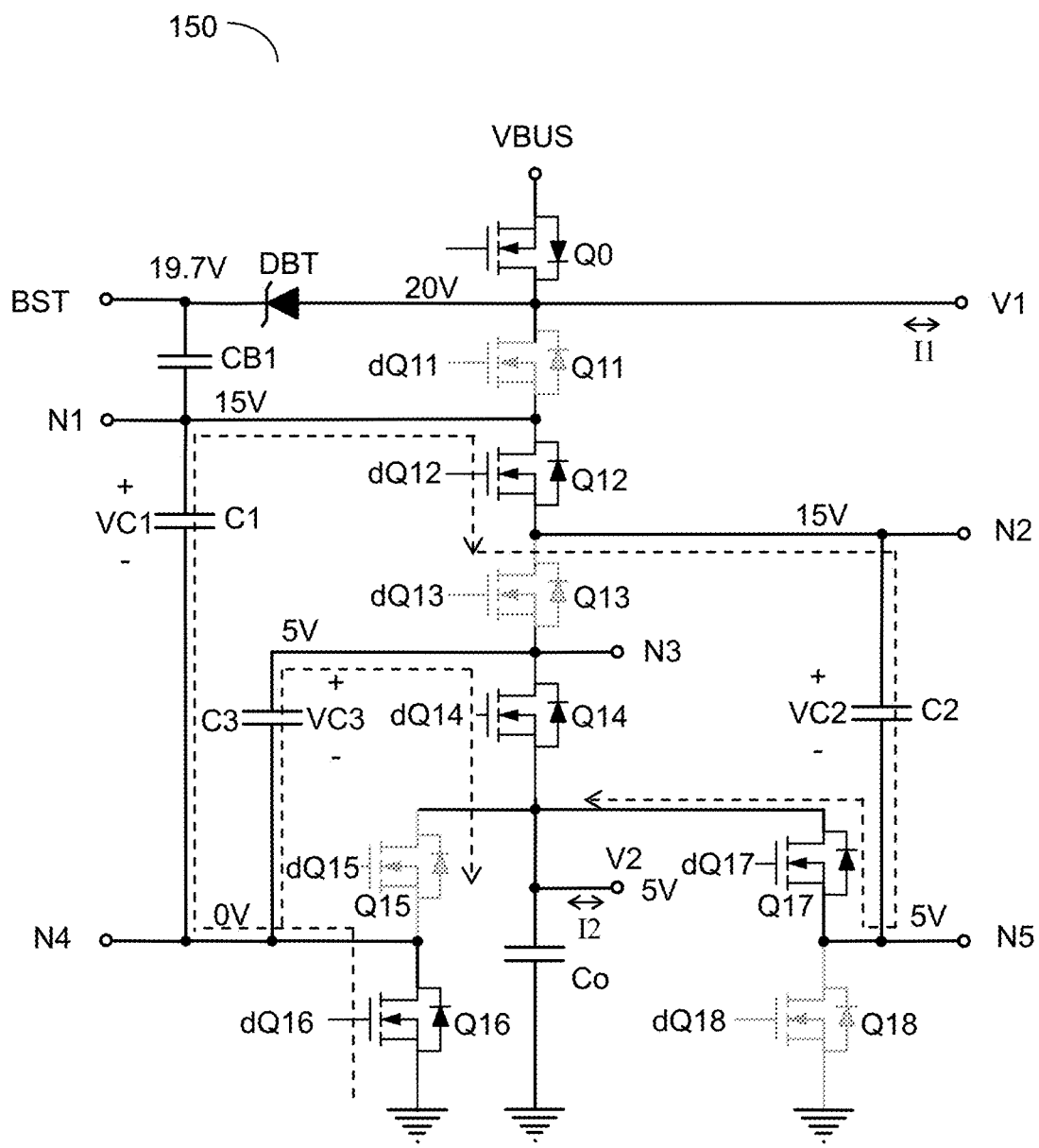

Please refer to FIG. 5A and FIG. 5B, which show a specific embodiment of a switching converter unit.

In one embodiment, the switching converter unit 150 includes: a capacitor C1 (corresponding to a first capacitor), a capacitor C2 (corresponding to a second capacitor) and a capacitor C3 (corresponding to a third capacitor). In this embodiment, the switches are configured to operably and periodically switch the connections of the capacitor C1, the capacitor C2 and the capacitor C3 according to a switching period Ts.

In one embodiment, the switching converter unit (e.g., the switching converter unit 150) of the present invention can operate in a 4-fold conversion mode, a 3-fold conversion mode, a 2-fold conversion mode or a 1-fold conversion mode. In one embodiment, during a first period PH1 within the switching period Ts, as shown by the dashed paths in FIG. 5A, the switches control the capacitor C1 to be electrically connected between the first power and the second power and control the capacitor C2 and the capacitor C3 to be electrically connected in series between the second power and a ground level. To elaborate in more detail, as shown in FIG. 5A, a positive end and a negative end of the capacitor C2 are reversely coupled to a positive end and a negative end of the capacitor C3.

During a second period PH2 within the switching period Ts, as shown by the dashed paths in FIG. 5B, the switches control the capacitor C1 and the capacitor C2 to be electrically connected in series between the second power and the ground level and control the capacitor C3 to be electrically connected in parallel with the second power. To elaborate in more detail, as shown in FIG. 5B, a positive end and a negative end of the capacitor C1 are reversely coupled to a positive end and a negative end of the capacitor C2. Thus, power conversion between the first power and the second power is executed through the above-mentioned periodical operations according to the switching period Ts, so that in the 4-fold conversion mode, the first voltage V1 is 4 times of the second voltage V2, whereas, the second current I2 is 4 times of the first current I1. Because the conversion ratio is relatively greater (i.e., 4-fold), under the same level of the second current I2, the level of the first current I1 (which is supplied from for example the above-mentioned adapter) can be effectively reduced.

Please still refer to FIG. 5A and FIG. 5B. In one specific embodiment, the switches include: switches Q11~Q18. The switch Q11, the switch Q12, the switch Q13 and the switch Q14 are sequentially coupled in in series between the first power and the second power. Besides, the switch Q11 and the switch Q12 are coupled to a node N1 in between, whereas, the switch Q12 and the switch Q13 are coupled to a node N2 in between, whereas, the switch Q13 and the switch Q14 are coupled to a node N3 in between. The switch Q15 and the switch Q16 are coupled in series between the second power and the ground level and are coupled to a node N4 in between. The switch Q17 and the switch Q18 are coupled in series between the second power and the ground level and are coupled to a node N5 in between. The capacitor C1 is coupled between the node N1 and the node N4, whereas, the capacitor C2 is coupled between the node N2 and the node N5, whereas, the capacitor C3 is coupled between the node N3 and the node N4.

In one embodiment, the above-mentioned control circuit 50 is configured to operably generate control signals dQ11~dQ18 for controlling the above-mentioned switches Q11~Q18, respectively.

In a 4-fold conversion mode, the switching converter unit 150 operates as follows: during the first period PH1 (referring to FIG. 5A), the switch Q11, the switch Q13, the switch Q15 and the switch Q18 are ON (i.e., the switches illustrated in black are "ON", as shown in FIGS. 5A and 5B; the same hereinafter), whereas, the switch Q12, the switch Q14, the switch Q16 and the switch Q17 are OFF (i.e., the switches illustrated in gray are "OFF", as shown in FIGS. 5A and 5B; the same hereinafter), thus controlling the capacitor C1 to be electrically connected between the first power and the second power and thus controlling the capacitor C2 and the capacitor C3 to be electrically connected in series between the second power and the ground level. To elaborate in more detail, in this embodiment, during the first period PH1, the voltage VC2 across the capacitor C2 is in-phase with the second voltage V2, whereas, the voltage VC3 across the capacitor C3 is in reversed-phase to the second voltage V2.

During the second period PH2 (referring to FIG. 5B), each of switches Q11-Q18 is operated according to a state complementary to a state during the first period PH1. That is, the switch Q11, the switch Q13, the switch Q15 and the switch Q18 are OFF, whereas, the switch Q12, the switch Q14, the switch Q16 and the switch Q17 are ON, so as to control the capacitor C1 and the capacitor C2 to be electrically connected in series between the second power and the ground level and control the capacitor C3 to be electrically connected in parallel with the second power. It is worthwhile mentioning that, in this embodiment, during the second period PH2, the voltage VC1 across the capacitor C1 is in-phase with the second voltage V2, whereas, the voltage VC2 across the capacitor C2 is in reversed-phase to the second voltage V2, whereas, the voltage VC3 across the capacitor C3 is in-phase with the second voltage V2.

Figure 6:
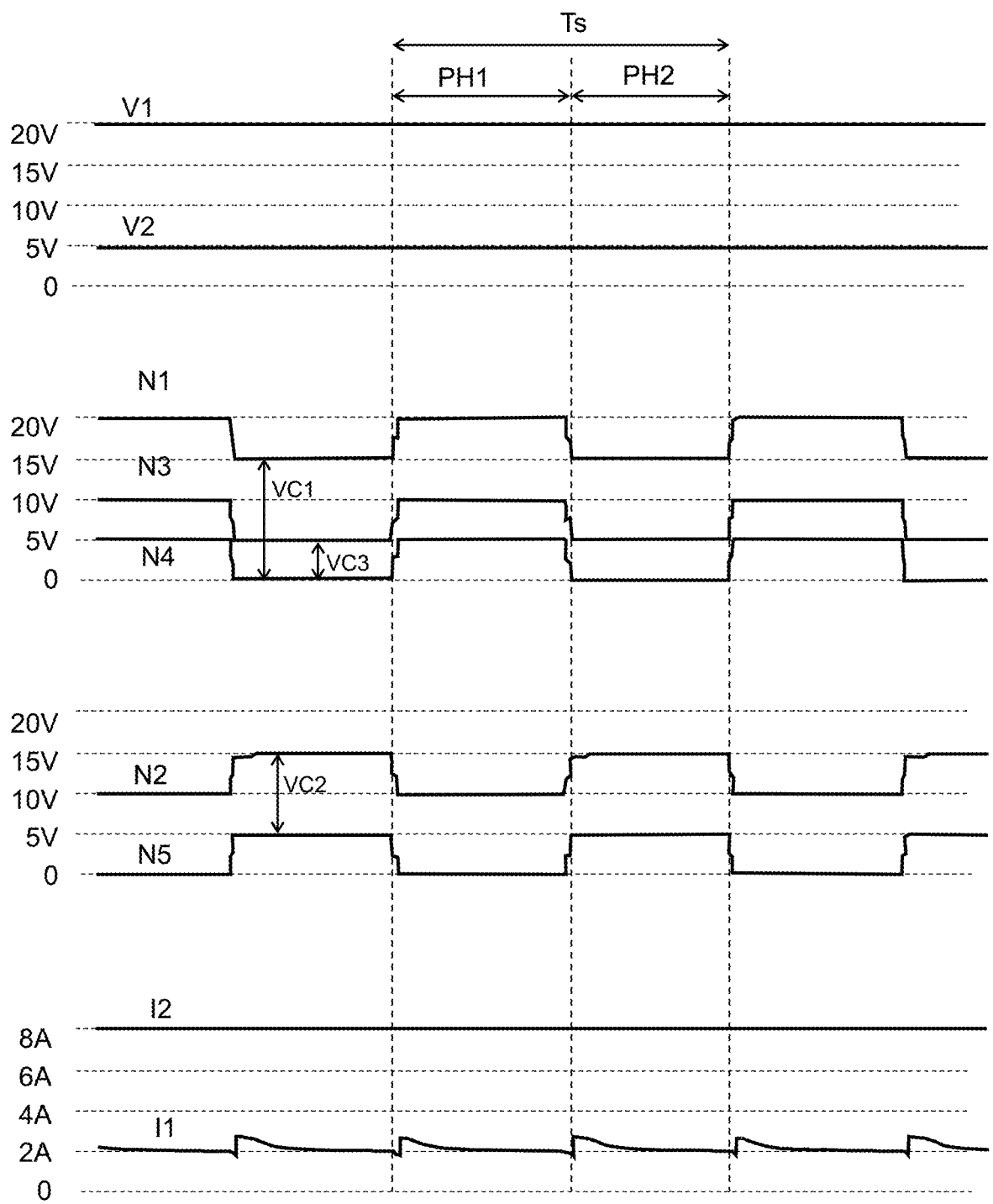
FIG. 6 illustrates a signal waveform diagram depicting the operation of a switched capacitor converter circuit according to an embodiment of the present invention.

Please refer to FIG. 6, which illustrates a signal waveform diagram depicting the operation of a switched capacitor converter circuit of FIG. 5A and FIG. 5B.

As shown in FIG. 6, in this embodiment, in the 4-fold conversion mode, during a steady state, the first voltage V1 is 4 times of the second voltage V2. In the embodiment shown in FIG. 6, the first voltage V1 is 20V, whereas, the second voltage V2 is 5V. The second current I2 is 4 times of the first current I1. In the embodiment shown in FIG. 6, the second current I2 is 8 A, whereas, the first current I1 is 2 A.

On the other hand, in this embodiment, a ratio among the voltage VC1 across the capacitor C1, the voltage VC2 across the capacitor C2, and the voltage VC3 across the capacitor C3, is 3:2:1. To elaborate in more detail, the voltage VC1 across the capacitor C1 is 3*V2 (for example but not limited to 15V shown in FIG. 6), whereas, the voltage VC2 across the capacitor C2 is 2*V2 (for example but not limited to 10V shown in FIG. 6), whereas, the voltage VC3 across the capacitor C3 is V2 (for example but not limited to 5V shown in FIG. 6).

It is worthwhile noting that, the voltage VC1 across the capacitor C1 corresponds to a voltage difference between the node N1 and the node N4 shown in FIG. 6. The voltage VC2 across the capacitor C2 corresponds to a voltage difference between the node N2 and the node N5 shown in FIG. 6. The voltage VC3 across the capacitor C3 corresponds to a voltage difference between the node N3 and the node N4 shown in FIG. 6.

Please still refer to FIG. 5A and FIG. 5B. In one embodiment, the switching converter unit 150 further includes a switch Q0, which is configured to operably control whether a main power supply VBUS supplied from the above-mentioned adapter is electrically connected to the first power, so as to determine whether to start the above-mentioned power conversion. Besides, in one embodiment, the switching converter unit 150 further includes a capacitor CB1 and a diode DBT. The capacitor CB1 and the diode DBT constitute a bootstrap circuit to supply a bootstrap voltage BST according to the first power. The bootstrap voltage BST is supplied to a driver circuit configured to operably drive the switches. In addition, in a case where the second power serves as an output power, in one embodiment, a capacitor Co corresponds to an output capacitor.

Figure 7A:
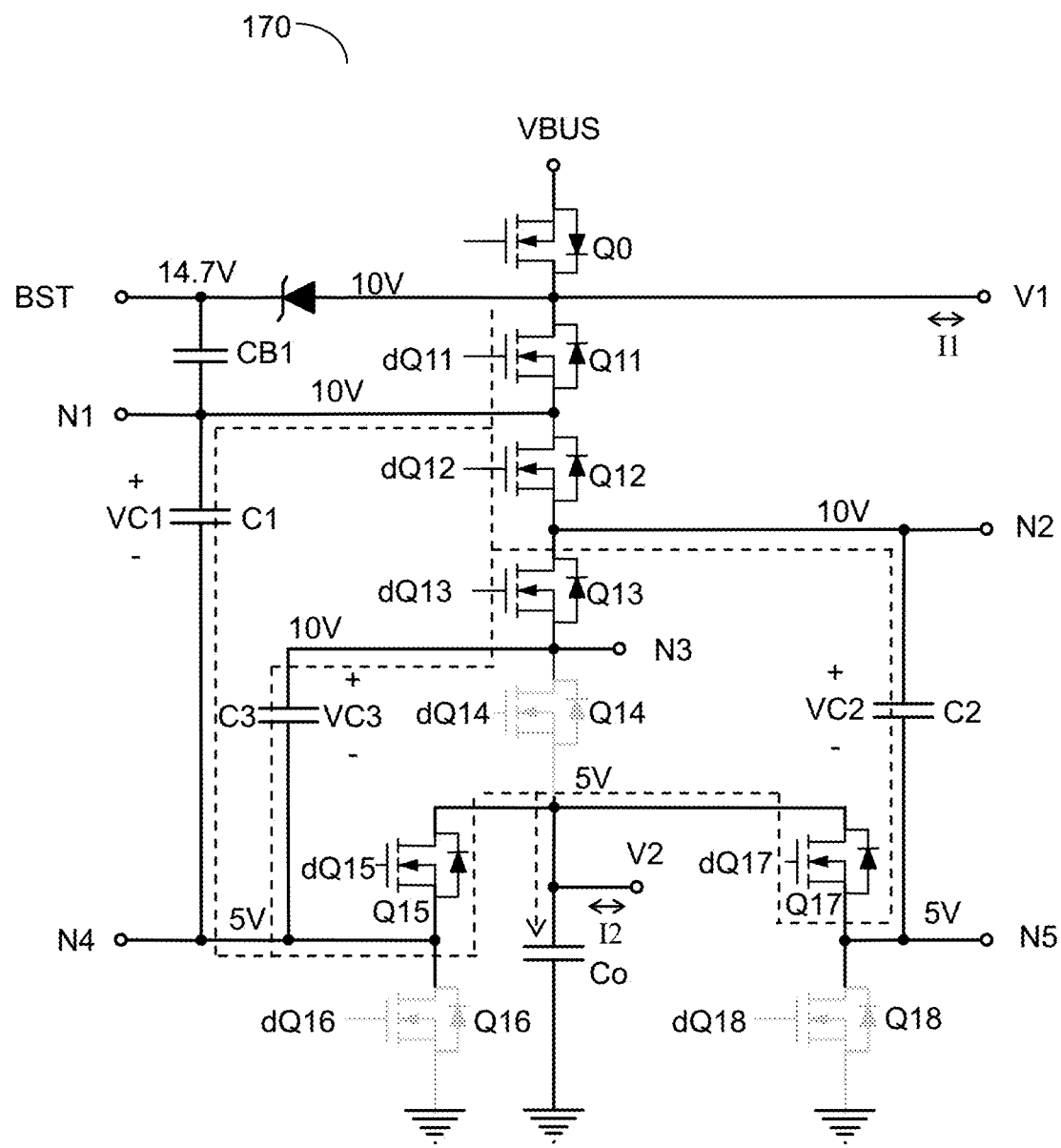
FIG. 7A and FIG. 7B show a specific embodiment of a switching converter unit.
Figure 7B:
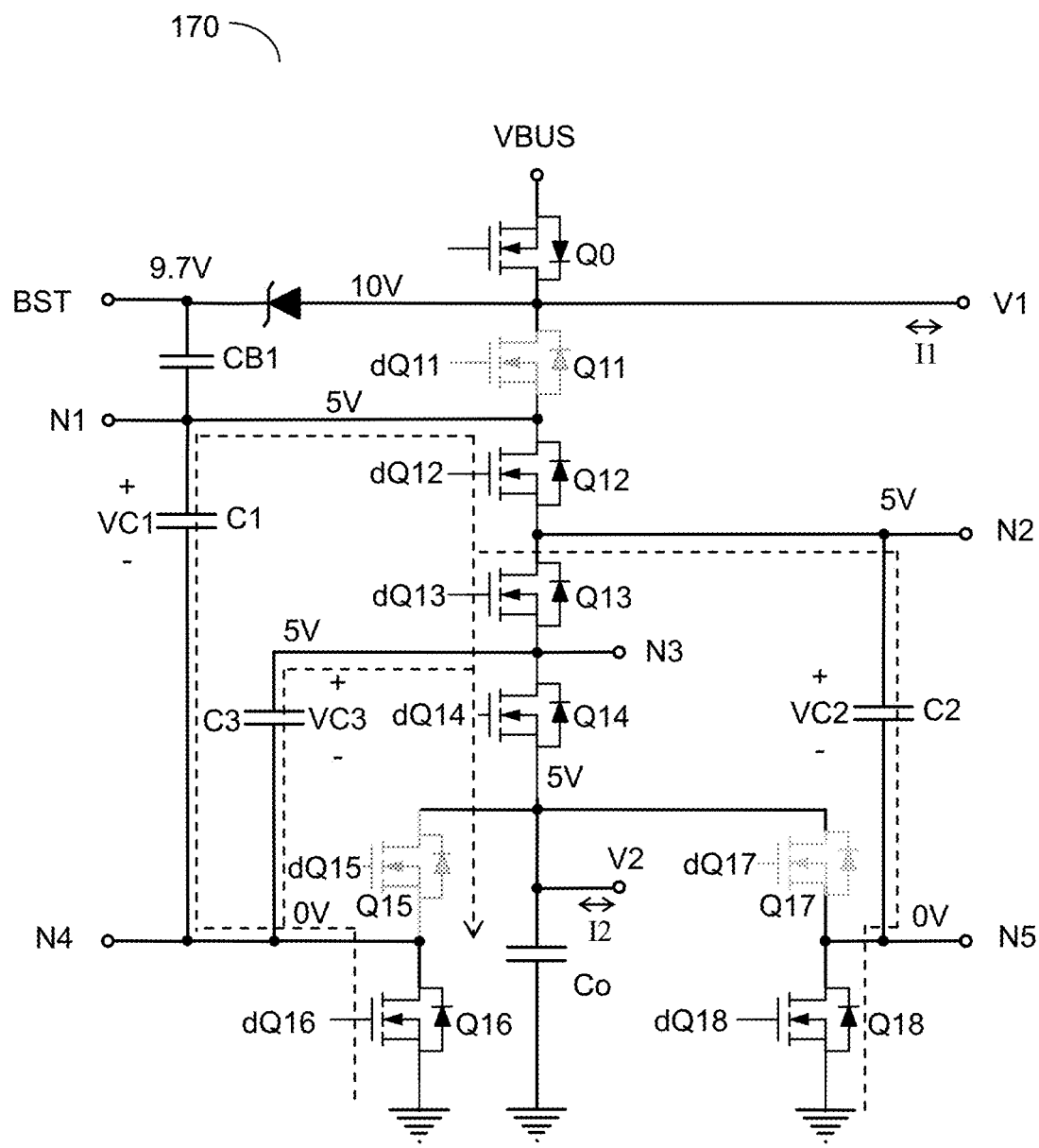

Please refer to FIG. 7A and FIG. 7B, which show a specific embodiment of a switching converter unit. The switching converter unit 170 shown in FIG. 7A and FIG. 7B has the same hardware configuration as the switching converter unit 150 shown in FIG. 5A and FIG. 5B, but is different in that: the switching converter unit 170 shown in FIG. 7A and FIG. 7B operates in a 2-fold conversion mode.

As shown in FIG. 7A and FIG. 7B, in a 2-fold conversion mode, the switch Q12 and the switch Q13 are always ON. In this embodiment, in the 2-fold conversion mode, during a first period PH1 within the switching period Ts, the switch Q11, the switch Q15 and the switch Q17 are ON, whereas, the switch Q14, the switch Q16 and the switch Q18 are OFF, thus controlling the capacitor C1, the capacitor C2 and the capacitor C3 to be electrically connected in parallel between the first power and the second power.

During a second period PH2 within the switching period Ts, the switch Q11 and each of the switch Q14 to the switch Q18 are operated according to a state complementary to a state during the first period PH1. That is, the switch Q11, the switch Q15 and the switch Q17 are OFF, whereas, the switch Q14, the switch Q16 and the switch Q18 are ON, so as to control the capacitor C1, the capacitor C2 and the capacitor C3 to be electrically connected in parallel between the second power and the ground level.

Figure 8:
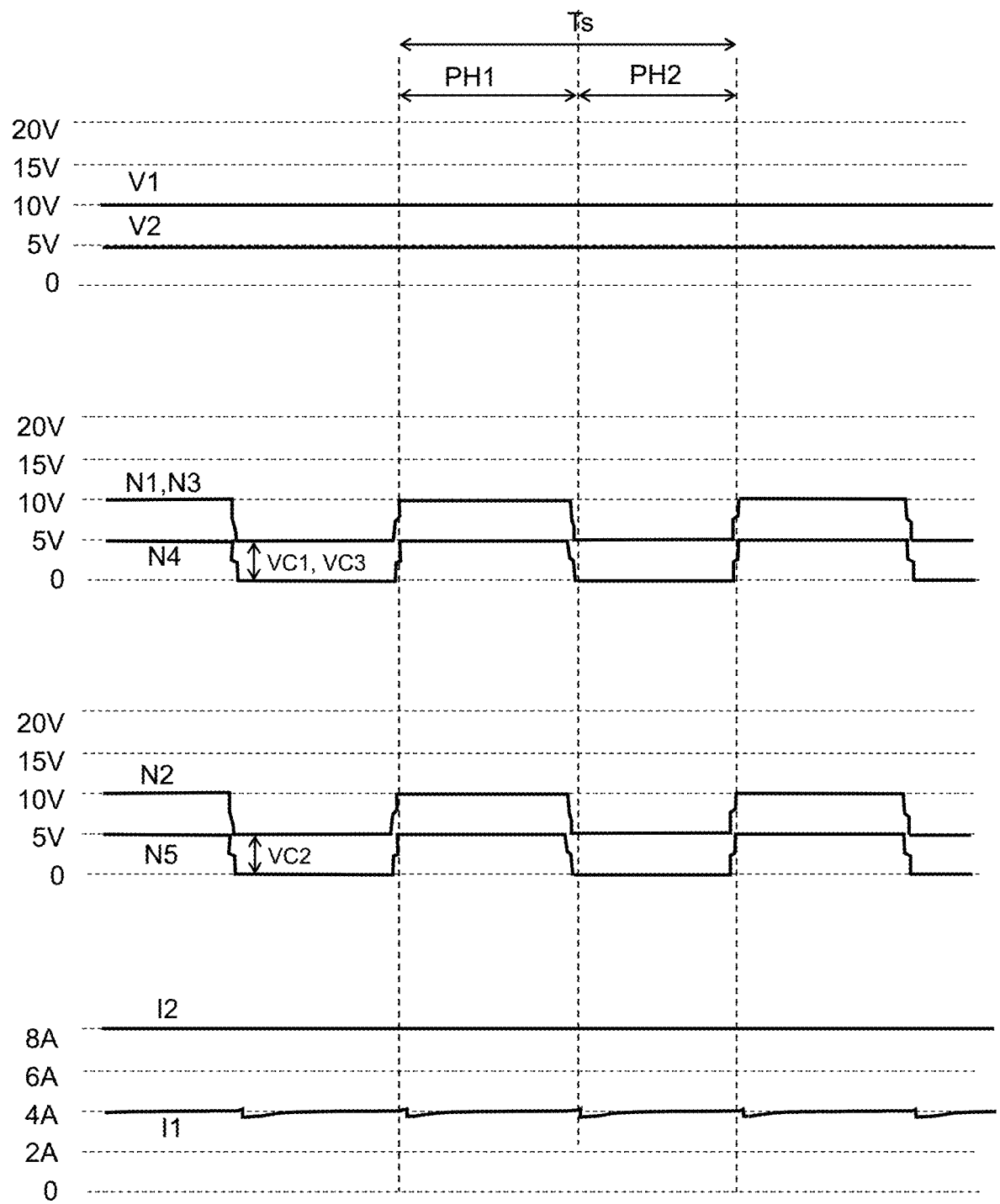
FIG. 8 illustrates a signal waveform diagram depicting the operation of a switched capacitor converter circuit according to another embodiment of the present invention.

Please refer to FIG. 8, which illustrates a signal waveform diagram depicting the operation of the switched capacitor converter circuit of FIG. 7A and FIG. 7B.

As shown in FIG. 8, in this embodiment, in the 2-fold conversion mode, during a steady state, the first voltage V1 is 2 times of the second voltage V2. In the embodiment shown in FIG. 8, the first voltage V1 is 10V, whereas, the second voltage V2 is 5V. The second current I2 is 2 times of the first current I1. In the embodiment shown in FIG. 8, the second current I2 is 8 A, whereas, the first current I1 is 4 A.

On the other hand, in this embodiment, a ratio among the voltage VC1 across the capacitor C1, the voltage VC2 across the capacitor C2, and the voltage VC3 across the capacitor C3 is 1:1:1. To elaborate in more detail, the voltage VC1 across the capacitor C1 is V2 (for example but not limited to 5V shown in FIG. 6), whereas, the voltage VC2 across the capacitor C2 is V2 (for example but not limited to 5V shown in FIG. 6), whereas, the voltage VC3 across the capacitor C3 is V2 (for example but not limited to 5V shown in FIG. 6).

Figure 9A:
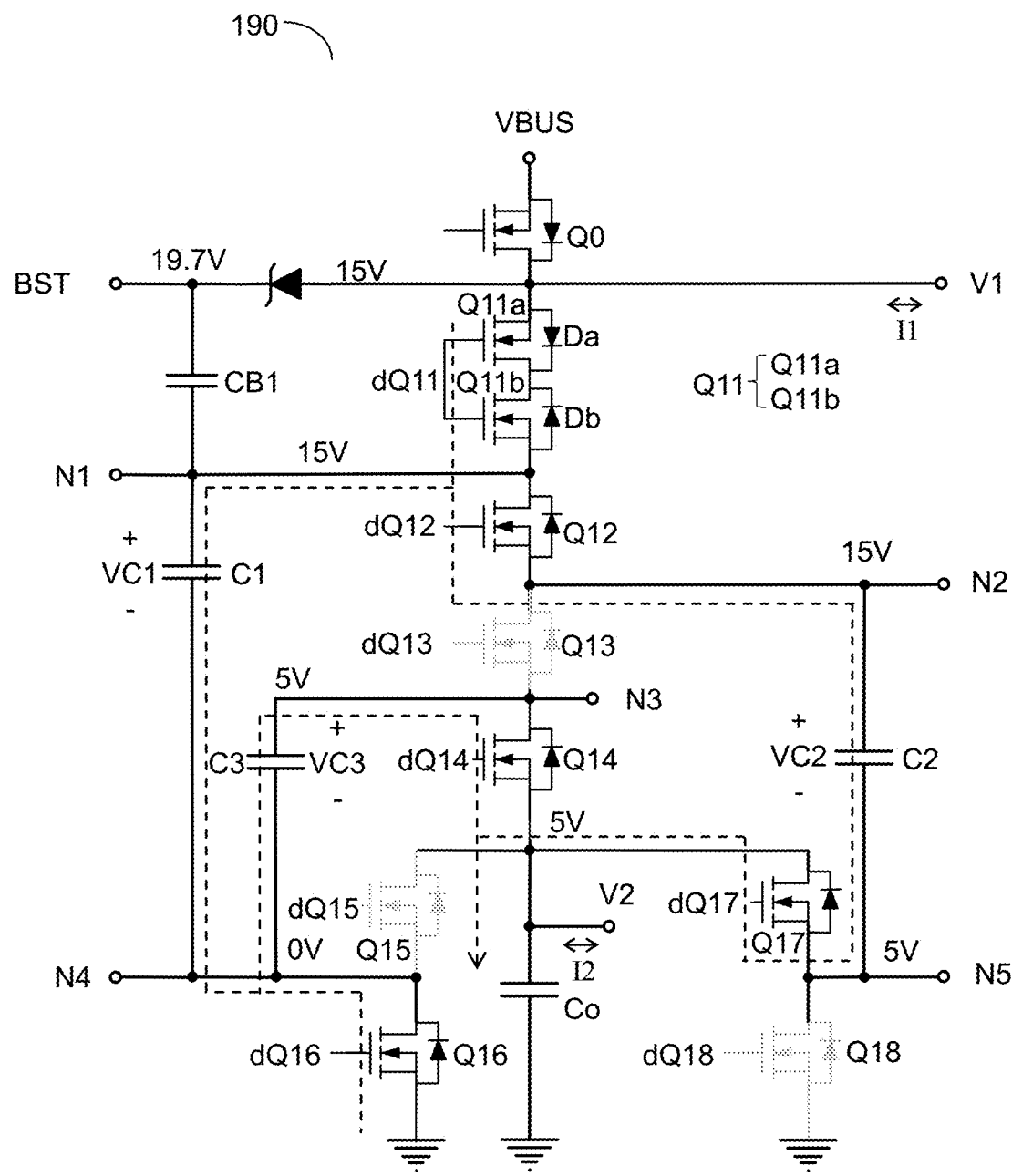
FIG. 9A and FIG. 9B show a specific embodiment of a switching converter unit.
Figure 9B:
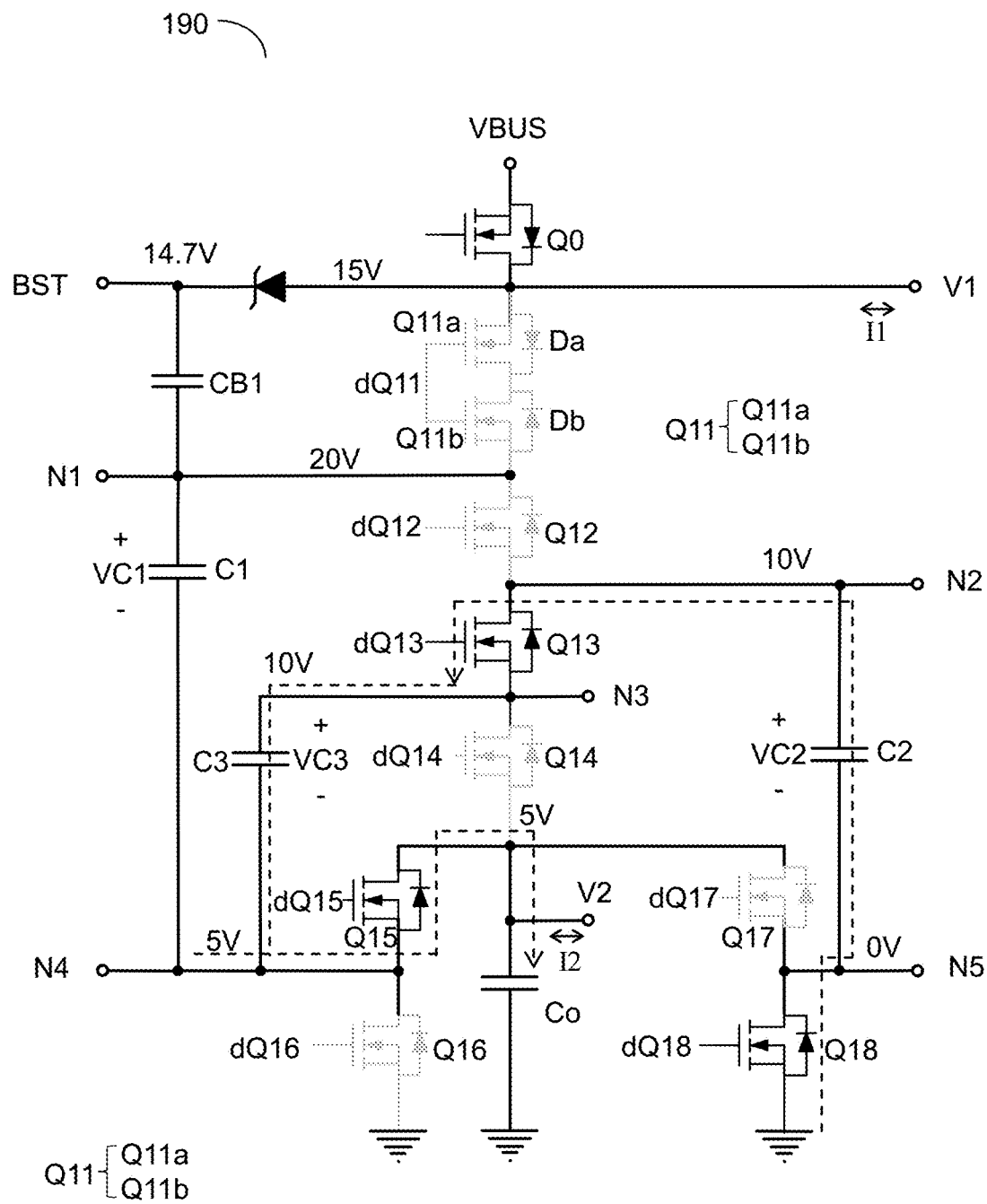

Please refer to FIG. 9A and FIG. 9B, which show a specific embodiment of a switching converter unit. The switching converter unit 190 shown in FIG. 9A and FIG. 9B has the same hardware configuration as the switching converter unit 150 shown in FIG. 5A and FIG. 5B, but is different in that: the switching converter unit 190 shown in FIG. 9A and FIG. 9B operates in a 3-fold conversion mode.

As shown in FIG. 9A and FIG. 9B, in a 3-fold conversion mode, during a first period PH1 within the switching period Ts, the switch Q11, the switch Q12, the switch Q14, the switch Q16 and the switch Q17 are ON, whereas, the switch Q13, the switch Q15 and the switch Q18 are OFF, thus controlling the capacitor C1 to be electrically connected between the first power and the ground level and thus controlling the capacitor C2 and the capacitor C3 to be electrically connected in series between the first power and the second power.

During a second period PH2 within the switching period Ts, each of the switch Q11 to the switch Q18 is operated according to a state complementary to a state during the first period PH1. That is, the switch Q11, the switch Q12, the switch Q14, the switch Q16 and the switch Q17 are OFF, whereas, the switch Q13, the switch Q15 and the switch Q18 are ON, so as to control a first end of the capacitor C1 to be floating at the node N1, and so as to control a second end of the capacitor C1 to be electrically connected with the second power, and so as to control the capacitor C2 and the capacitor C3 to be electrically connected in series between the second power and the ground level. To elaborate in more detail, in this embodiment, during the second period PH2, the voltage VC2 across the capacitor C2 is in-phase with the second voltage V2, whereas, the voltage VC3 across the capacitor C3 is in reversed-phase to the second voltage V2.

Figure 10:
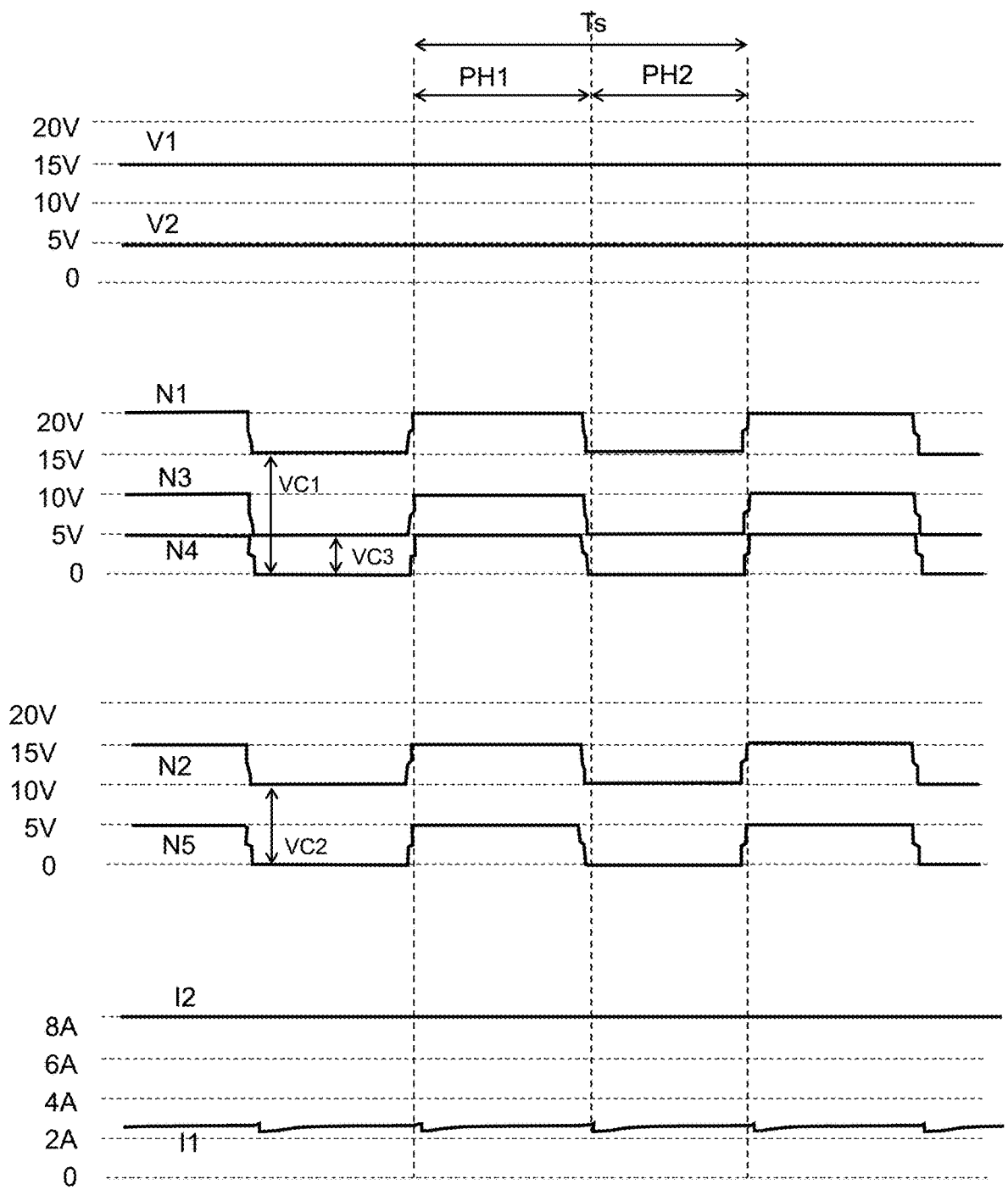
FIG. 10 illustrates a signal waveform diagram depicting the operation of a switched capacitor converter circuit according to yet another embodiment of the present invention.

Please refer to FIG. 10, which illustrates a signal waveform diagram depicting the operation of the switched capacitor converter circuit of FIG. 9A and FIG. 9B.

As shown in FIG. 10, in this embodiment, in the 3-fold conversion mode, during a steady state, the first voltage V1 is 3 times of the second voltage V2. In the embodiment shown in FIG. 10, the first voltage V1 is 15V, whereas, the second voltage V2 is 5V. The second current I2 is 3 times of the first current I1. In the embodiment shown in FIG. 10, the second current I2 is 8 A, whereas, the first current I1 is approximately 2.67 A.

It is worthwhile mentioning that, in this embodiment, as shown in FIG. 9A and FIG. 9B, the switch Q11 includes a transistor Q11a and a transistor Q11b connected in series to each other, wherein a direction of a body diode Da of the transistor Q11a is opposite to a direction of a body diode Db of the transistor Q11b, so that there will not be current flowing through the body diodes when the switch Q11 is OFF.

Figure 11:
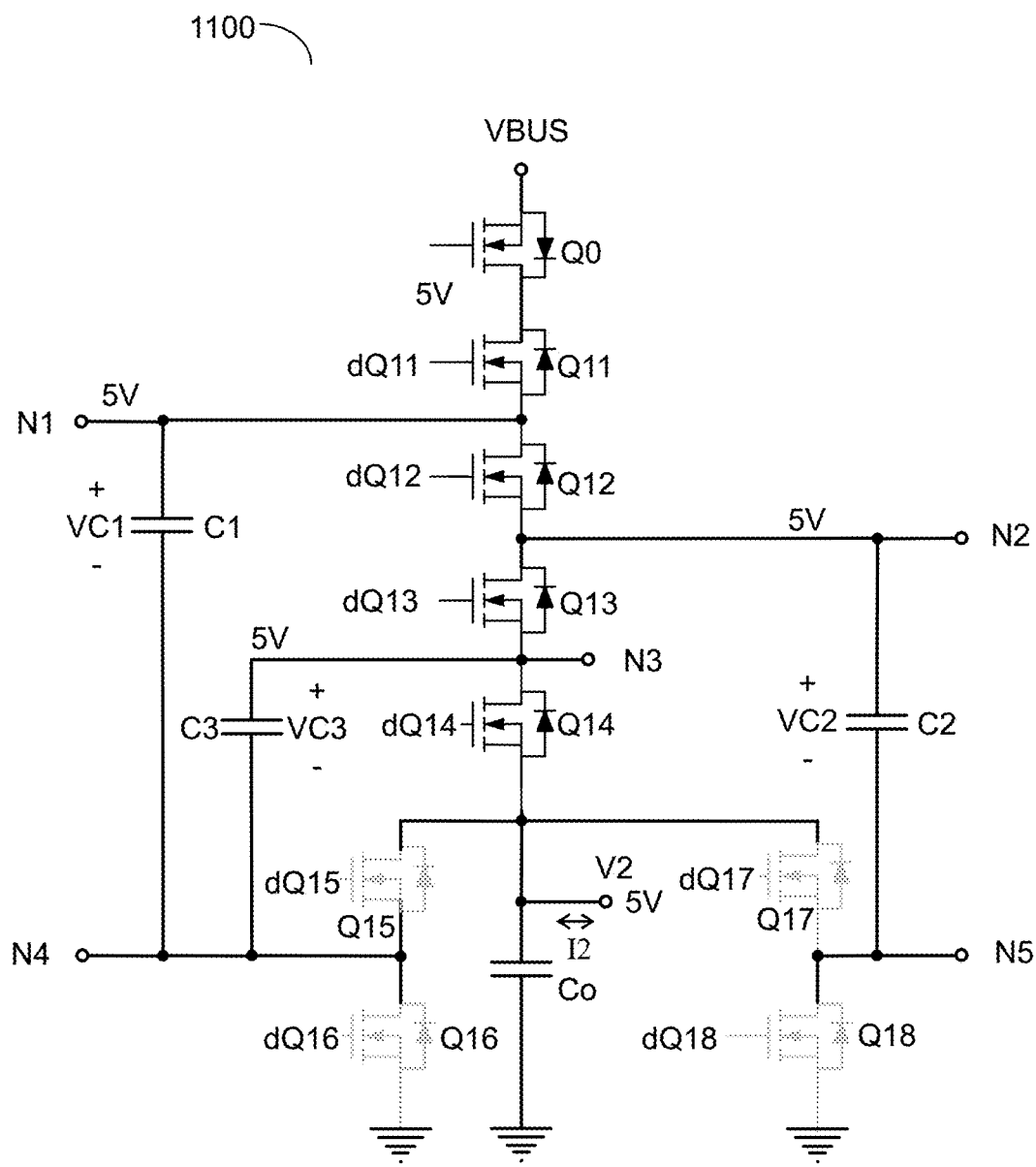
FIG. 11 shows a specific embodiment of a switching converter unit.

Please refer to FIG. 11, which shows a specific embodiment of a switching converter unit. In this embodiment, in a bypass mode, the switch Q11 to the switch Q14 are ON, whereas, the switch Q15 to the switch Q18 are OFF, so that the first power is directly electrically connected to the second power. In other words, the switching converter unit 1100 of this embodiment operates in a 1-fold conversion mode.

Figure 12:
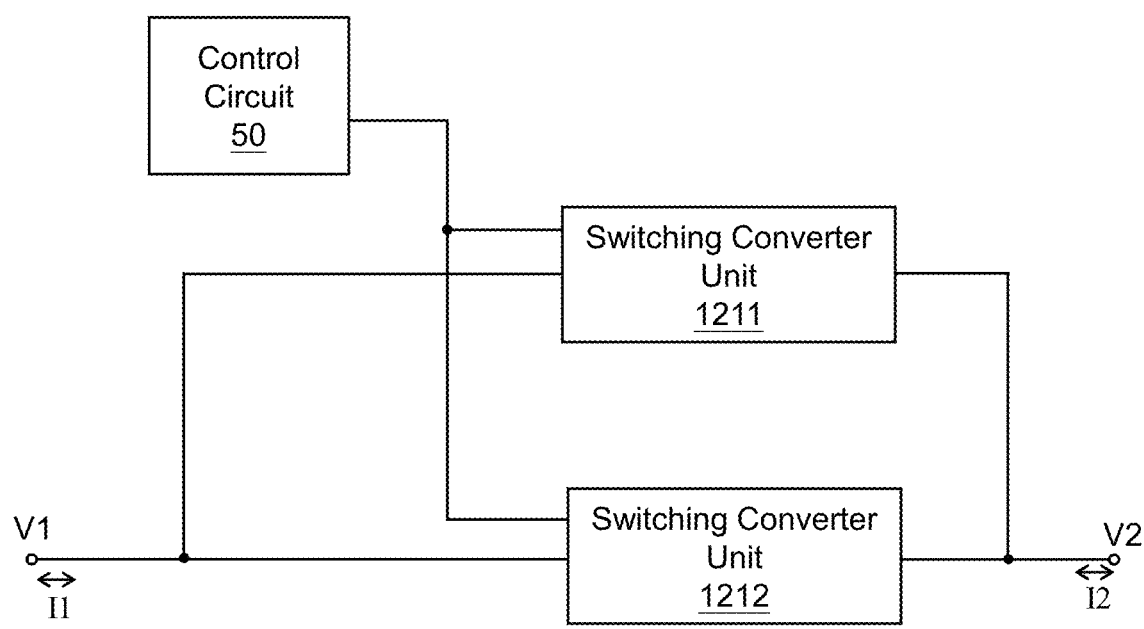
FIG. 12 shows a schematic circuit block diagram of a switched capacitor converter circuit according to another embodiment of the present invention.

Please refer to FIG. 12, which shows a schematic circuit block diagram of a switched capacitor converter circuit according to another embodiment of the present invention.

The switched capacitor converter circuit 1200 includes: a switching converter unit 1211 and a switching converter unit 1212. In one embodiment, each of the switching converter unit 1211 and the switching converter unit 1212 switches respective corresponding switches by interleaving phases, so as to execute power conversion between the first power and the second power, thereby effectively reducing unwanted ripples in the output voltage (corresponding to V2 or V1) and in the output current (corresponding to I1 or I2).

Please refer back to FIG. 5A, FIG. 5B and FIG. 6. According to the levels of the voltages illustrated in FIG. 5A, FIG. 5B and FIG. 6, in a 4-fold conversion mode, in a case where the switch Q12 and the switch Q13 are OFF, the switch Q12 and the switch Q13 both have a drain-source voltage of 10V (corresponding to 2*V2), whereas, in a case where the rest switches (i.e. switches other than the switch Q12 and the switch Q13) are OFF, the rest switches all have a drain-source voltage of 5V (corresponding to V2). On the other hand, in a 3-fold conversion mode, in a case where the switch Q13 is OFF, the switch Q13 has a drain-source voltage of 10V, whereas, in a case where the rest switches (i.e. switches other than the switch Q13) are OFF, the rest switches all have a drain-source voltage of 5V. In other words, in the switches of the switched capacitor converter circuit, only the switch Q12 and the switch Q13 need to withstand a peak voltage of 2*V2 (corresponding to a first peak voltage) during power conversion, whereas, all the other switches (other than the switch Q12 and the switch Q13) only need to withstand a peak voltage of V2 during power conversion (corresponding to a second peak voltage).

Consequently, as compared to the prior art, because the present invention requires a much less number of switches (e.g., the switch Q12 and the switch Q13) to withstand high voltage, the manufacturing cost of the present invention can be effectively reduced. In terms of number, in a 4-fold conversion mode, the number of switches required to withstand high voltage required by the switching converter unit of the present invention is two, whereas, the total number of switches is eight. Therefore, it is only required for ¼ of the total number of switches to withstand high voltage. However, in the prior art, it is required for ½ of the total number of switches to withstand high voltage. Hence, as compared to the prior art, the number of switches required to withstand high voltage of the present invention is much less.

To elaborate in more detail, for example, the withstand voltage of the switch Q12 and the switch Q13 can be implemented as a voltage level of 2*V2 plus a safety range (corresponding to a first withstand voltage), whereas, the withstand voltage of the rest switches (i.e. switches other than the switch Q12 and the switch Q13) can be implemented as a voltage level of V2 plus a safety range (corresponding to a second withstand voltage). In one embodiment, the relationship among the first peak voltage, the second peak voltage, the first withstand voltage and the second withstand voltage can be represented as follow: the first withstand voltage is greater than the first peak voltage; and the first peak voltage is greater than the second withstand voltage; and the second withstand voltage is greater than the second peak voltage. "Withstand voltage" is a parameter of a switch wherein, when a drain-source voltage across a switch is greater than the withstand voltage of such switch, such switch will suffer serious damage.

The present invention proposes an innovative switched capacitor converter circuit having multiple different conversion ratios. The present invention can flexibly select a particular conversion ratio according to the demands of power conversion direction, battery voltage and/or battery state, etc., to execute switched capacitor power conversion, thereby for example charging a battery or converting the electrical energy of the battery to supply power to an external circuit. Moreover, because the present invention requires a relatively less number of switches which need to withstanding high voltage, the manufacturing cost as well as the circuit size can be effectively reduced.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor converter circuit, which is configured to operably convert a first power to a second power or convert the second power to the first power; the switched capacitor converter circuit comprising:
   at least one switching converter unit; and
   a control circuit, which is configured to operably control the at least one switching converter unit;
   wherein the at least one switching converter unit includes:
      a plurality of capacitors including a first capacitor, a second capacitor and a third capacitor; and
      a plurality of switches, which are configured to operably and periodically switch the connections of the plurality of capacitors according to a switching period;
      wherein in a 4-fold conversion mode, during a first period within the switching period, the plurality of switches control the first capacitor to be electrically connected between the first power and the second power and control the second capacitor and the third capacitor to be electrically connected in series between the second power and a ground level;
      wherein in the 4-fold conversion mode, during a second period within the switching period, the plurality of switches control the first capacitor and the second capacitor to be electrically connected in series between the second power and the ground level and control the third capacitor to be electrically connected in parallel with the second power;
      whereby power conversion between the first power and the second power is executed through periodically repeating the switching period, so that in the 4-fold conversion mode, a first voltage of the first power is 4 times of a second voltage of the second power, whereas, a second current of the second power is 4 times of a first current of the first power.

2. The switched capacitor converter circuit of claim 1, wherein the plurality of switches include: first to eighth switches, wherein the first switch, the second switch, the third switch and the fourth switch are sequentially coupled in in series between the first power and the second power, and wherein the first switch and the second switch are coupled to a first node in between, whereas, the second switch and the third switch are coupled to a second node in between, whereas, the third switch and the fourth switch are coupled to a third node in between, and wherein the fifth switch and the sixth switch are coupled in series between the second power and the ground level and are coupled to a fourth node in between, wherein the seventh switch and the eighth switch are coupled in series between the second power and the ground level and are coupled to a fifth node in between; wherein the first capacitor is coupled between the first node and the fourth node, whereas, the second capacitor is coupled between the second node and the fifth node, whereas, the third capacitor is coupled between the third node and the fourth node;
   wherein in the 4-fold conversion mode, during the first period, the first switch, the third switch, the fifth switch and the eighth switch are ON, whereas, the second switch, the fourth switch, the sixth switch and the seventh switch are OFF, thus controlling the first capacitor to be electrically connected between the first power and the second power and thus controlling the second capacitor and the third capacitor to be electrically connected in series between the second power and the ground level;
   wherein in the 4-fold conversion mode, during the second period, each of the first switch to the eighth switch is operated according to a state complementary to a state during the first period, so as to control the first capacitor and the second capacitor to be electrically connected in series between the second power and the ground level and control the third capacitor to be electrically connected in parallel with the second power;
whereby the power conversion between the first power and the second power is executed through periodically repeating the switching period.

3. The switched capacitor converter circuit of claim 2, wherein in a 3-fold conversion mode, during a first period within the switching period, the first switch, the second switch, the fourth switch, the sixth switch and the seventh switch are ON, whereas, the third switch, the fifth switch and the eighth switch are OFF, thus controlling the first capacitor to be electrically connected between the first power and the ground level and thus controlling the second capacitor and the third capacitor to be electrically connected in series between the first power and the second power;
wherein in the 3-fold conversion mode, during the second period, each of the first switch to the eighth switch is operated according to a state complementary to a state during the first period, so as to control a first end of the first capacitor to be floating, and so as to control a second end of the first capacitor to be electrically connected with the second power, and so as to control the second capacitor and the third capacitor to be electrically connected in series between the second power and the ground level;
whereby the power conversion between the first power and the second power is executed through periodically repeating the switching period, so that in the 3-fold conversion mode, a first voltage of the first power is 3 times of a second voltage of the second power, whereas, a second current of the second power is 3 times of a first current of the first power.

4. The switched capacitor converter circuit of claim 3, wherein the first switch includes: a first transistor and a second transistor connected in series to each other, wherein a direction of a body diode of the first transistor is opposite to a direction of a body diode of the second transistor.

5. The switched capacitor converter circuit of claim 2, wherein a first part of the plurality of switches have a first withstand voltage, and wherein a peak voltage that the first part of the plurality of switches are required to withstand during power conversion is defined as a first peak voltage, wherein a second part of the plurality of switches have a second withstand voltage, and wherein a peak voltage that the second part of the plurality of switches are required to withstand during power conversion is defined as a second peak voltage, wherein the first peak voltage is 2 times of the second peak voltage.

6. The switched capacitor converter circuit of claim 5, wherein a number of the first part of the plurality of switches is smaller than ½ of a total number of the plurality of switches, whereas, a number of the second part of the plurality of switches is greater than ½ of the total number of the plurality of switches.

7. The switched capacitor converter circuit of claim 5, wherein in the 4-fold conversion mode, the first part of the plurality of switches include: the second switch and the third switch, whereas, the second part of the plurality of switches include: the first switch and the fourth switch to the eighth switch.

8. The switched capacitor converter circuit of claim 5, wherein a relationship among the first peak voltage, the second peak voltage, the first withstand voltage and the second withstand voltage is represented as follow:
the first withstand voltage is greater than the first peak voltage; and the first peak voltage is greater than the second withstand voltage; and
the second withstand voltage is greater than the second peak voltage.

9. The switched capacitor converter circuit of claim 2, wherein in a 2-fold conversion mode, the second switch and the third switch are always ON;
wherein in the 2-fold conversion mode, during a first period within the switching period, the first switch, the fifth switch and the seventh switch are ON, whereas, the fourth switch, the sixth switch and the eighth switch are OFF, thus controlling the first capacitor, the second capacitor and the third capacitor to be electrically connected in parallel between the first power and the second power;
wherein in the 2-fold conversion mode, during a second period within the switching period, the first switch and each of the fourth switch to the eighth switch are operated according to a state complementary to a state during the first period, so as to control the first capacitor, the second capacitor and the third capacitor to be electrically connected in parallel between the second power and the ground level;
whereby the power conversion between the first power and the second power is executed through periodically repeating the switching period, so that in the 2-fold conversion mode, a first voltage of the first power is 2 times of a second voltage of the second power, whereas, a second current of the second power is 2 times of a first current of the first power.

10. The switched capacitor converter circuit of claim 2, wherein in a bypass mode, the first switch to the fourth switch are ON, whereas, the fifth switch to the eighth switch are OFF, so that the first power is directly electrically connected to the second power.

11. The switched capacitor converter circuit of claim 2, wherein the at least one switching converter unit includes: a first switching converter unit and a second switching converter unit, which are coupled in parallel between the first power and the second power, wherein each of the first switching converter unit and the second switching converter unit switches respective corresponding plurality of switches by interleaving phases, so as to execute power conversion between the first power and the second power.

12. The switched capacitor converter circuit of claim 1, wherein in the 4-fold conversion mode, during a steady state, a ratio among a voltage across the first capacitor, a voltage across the second capacitor, and a voltage across the third capacitor is 3:2:1.

13. A switching converter unit, which is configured to operably convert a first power to a second power or convert the second power to the first power; the switching converter unit comprising:
a plurality of capacitors including a first capacitor, a second capacitor and a third capacitor; and
a plurality of switches, which are configured to operably and periodically switch the connections of the plurality of capacitors according to a switching period;
wherein in a 4-fold conversion mode, during a first period within the switching period, the plurality of switches control the first capacitor to be electrically connected between the first power and the second power and control the second capacitor and the third capacitor to be electrically connected in series between the second power and a ground level;
wherein in the 4-fold conversion mode, during a second period within the switching period, the plurality of switches control the first capacitor and the second capacitor to be electrically connected in series between the second power and the ground level and control the third capacitor to be electrically connected in parallel with the second power;

whereby power conversion between the first power and the second power is executed through periodically repeating the switching period, so that in the 4-fold conversion mode, a first voltage of the first power is 4 times of a second voltage of the second power, whereas, a second current of the second power is 4 times of a first current of the first power.

14. The switching converter unit of claim 13, wherein the plurality of switches include: first to eighth switches, wherein the first switch, the second switch, the third switch and the fourth switch are sequentially coupled in in series between the first power and the second power, and wherein the first switch and the second switch are coupled to a first node in between, whereas, the second switch and the third switch are coupled to a second node in between, whereas, the third switch and the fourth switch are coupled to a third node in between, and wherein the fifth switch and the sixth switch are coupled in series between the second power and the ground level and are coupled to a fourth node in between, wherein the seventh switch and the eighth switch are coupled in series between the second power and the ground level and are coupled to a fifth node in between; wherein the first capacitor is coupled between the first node and the fourth node, whereas, the second capacitor is coupled between the second node and the fifth node, whereas, the third capacitor is coupled between the third node and the fourth node;

wherein in the 4-fold conversion mode, during the first period, the first switch, the third switch, the fifth switch and the eighth switch are ON, whereas, the second switch, the fourth switch, the sixth switch and the seventh switch are OFF, thus controlling the first capacitor to be electrically connected between the first power and the second power and thus controlling the second capacitor and the third capacitor to be electrically connected in series between the second power and the ground level;

wherein in the 4-fold conversion mode, during the second period, each of the first switch to the eighth switch is operated according to a state complementary to a state during the first period, so as to control the first capacitor and the second capacitor to be electrically connected in series between the second power and the ground level and control the third capacitor to be electrically connected in parallel with the second power;

whereby the power conversion between the first power and the second power is executed through periodically repeating the switching period.

15. The switching converter unit of claim 14, wherein in a 3-fold conversion mode, during a first period within the switching period, the first switch, the second switch, the fourth switch, the sixth switch and the seventh switch are ON, whereas, the third switch, the fifth switch and the eighth switch are OFF, thus controlling the first capacitor to be electrically connected between the first power and the ground level and thus controlling the second capacitor and the third capacitor to be electrically connected in series between the first power and the second power;

wherein in the 3-fold conversion mode, during the second period, each of the first switch to the eighth switch is operated according to a state complementary to a state during the first period, so as to control a first end of the first capacitor to be floating, and so as to control a second end of the first capacitor to be electrically connected with the second power, and so as to control the second capacitor and the third capacitor to be electrically connected in series between the second power and the ground level;

whereby the power conversion between the first power and the second power is executed through periodically repeating the switching period, so that in the 3-fold conversion mode, a first voltage of the first power is 3 times of a second voltage of the second power, whereas, a second current of the second power is 3 times of a first current of the first power.

16. The switching converter unit of claim 15, wherein the first switch includes: a first transistor and a second transistor connected in series to each other, wherein a direction of a body diode of the first transistor is opposite to a direction of a body diode of the second transistor.

17. The switching converter unit of claim 14, wherein in a 2-fold conversion mode, the second switch and the third switch are always ON;

wherein in the 2-fold conversion mode, during a first period within the switching period, the first switch, the fifth switch and the seventh switch are ON, whereas, the fourth switch, the sixth switch and the eighth switch are OFF, thus controlling the first capacitor, the second capacitor and the third capacitor to be electrically connected in parallel between the first power and the second power;

wherein in the 2-fold conversion mode, during a second period within the switching period, the first switch and each of the fourth switch to the eighth switch are operated according to a state complementary to a state during the first period, so as to control the first capacitor, the second capacitor and the third capacitor to be electrically connected in parallel between the second power and the ground level;

whereby the power conversion between the first power and the second power is executed through periodically repeating the switching period, so that in the 2-fold conversion mode, a first voltage of the first power is 2 times of a second voltage of the second power, whereas, a second current of the second power is 2 times of a first current of the first power.

\* \* \* \* \*